US010666848B2

(12) United States Patent
Powell et al.

(10) Patent No.: US 10,666,848 B2
(45) Date of Patent: May 26, 2020

(54) REMOTE DEPTH SENSING VIA RELAYED DEPTH FROM DIFFUSION

(71) Applicant: Microsoft Technology Licensing, LLC, Redmond, WA (US)

(72) Inventors: Karlton D. Powell, Lake Stevens, WA (US); Vivek Pradeep, Snohomish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 681 days.

(21) Appl. No.: 14/704,726

(22) Filed: May 5, 2015

(65) Prior Publication Data

US 2016/0330360 A1 Nov. 10, 2016

(51) Int. Cl.
*H04N 5/232* (2006.01)
*H04N 5/357* (2011.01)
(Continued)

(52) U.S. Cl.
CPC ......... *H04N 5/23203* (2013.01); *G01B 11/14* (2013.01); *G01B 11/22* (2013.01);
(Continued)

(58) Field of Classification Search
CPC .. H04N 5/23203; H04N 5/357; H04N 5/2254; H04N 13/0203; H04N 13/0271;
(Continued)

(56) References Cited

U.S. PATENT DOCUMENTS 4,704,022 A * 11/1987 Nozawa ................. G03B 19/12
396/384
6,732,929 B2 5/2004 Good et al.
(Continued)

FOREIGN PATENT DOCUMENTS

CN 102693046 A 9/2012
CN 102770873 A 11/2012
(Continued)

OTHER PUBLICATIONS

Sales, T. R. M., "Structured microlens arrays for beam shaping," Optical Engineering 42, 11, pp. 3084-3085, 2003.*
(Continued)

*Primary Examiner* — Matthew K Kwan
(74) *Attorney, Agent, or Firm* — Alleman Hall Creasman & Tuttle LLP

(57) ABSTRACT

Remote depth sensing techniques are described via relayed depth from diffusion. In one or more implementations, a remote depth sensing system is configured to sense depth as relayed from diffusion. The system includes an image capture system including an image sensor and an imaging lens configured to transmit light to the image sensor through an intermediate image plane that is disposed between the imaging lens and the image sensor, the intermediate plane having an optical diffuser disposed proximal thereto that is configured to diffuse the transmitted light. The system also includes a depth sensing module configured to receive one or more images from the image sensor and determine a distance to one or more objects in an object scene captured by the one or more images using a depth by diffusion technique that is based at least in part on an amount of blurring exhibited by respective said objects in the one or more images.

20 Claims, 10 Drawing Sheets

(51) Int. Cl.

| | |
|---|---|
| *H04N 13/20* | (2018.01) |
| *G01B 11/14* | (2006.01) |
| *G01B 11/22* | (2006.01) |
| *H04N 13/204* | (2018.01) |
| *H04N 5/225* | (2006.01) |
| *G01B 11/24* | (2006.01) |
| *G01B 11/25* | (2006.01) |
| *G06T 7/571* | (2017.01) |
| *H04N 13/271* | (2018.01) |
| *H04N 13/236* | (2018.01) |

(52) U.S. Cl.
CPC .............. *G01B 11/24* (2013.01); *G01B 11/25* (2013.01); *G06T 7/571* (2017.01); *H04N 5/2254* (2013.01); *H04N 5/357* (2013.01); *H04N 13/204* (2018.05); *H04N 13/236* (2018.05); *H04N 13/271* (2018.05)

(58) Field of Classification Search
CPC ............. H04N 13/0235; H04N 13/204; H04N 13/236; G01B 11/24; G01B 11/22; G01B 11/14; G01B 11/25; G06T 7/571
USPC .......................................................... 348/42
See application file for complete search history.

(56) References Cited

U.S. PATENT DOCUMENTS

| | | | |
|---|---|---|---|
| 7,724,378 B2 | 5/2010 | Babayoff | |
| 7,777,895 B2 | 8/2010 | Medower et al. | |
| 8,350,847 B2 | 1/2013 | Shpunt | |
| 8,493,496 B2 | 7/2013 | Freedman et al. | |
| 2005/0275630 A1* | 12/2005 | Butterworth | G02B 27/288 |
| | | | 345/166 |
| 2009/0219253 A1 | 9/2009 | Izadi et al. | |
| 2009/0244355 A1* | 10/2009 | Horie | G02B 5/22 |
| | | | 348/340 |
| 2010/0224796 A1 | 9/2010 | Mertz et al. | |
| 2012/0059625 A1 | 3/2012 | Kim et al. | |
| 2012/0127127 A1* | 5/2012 | Large | G06F 3/0425 |
| | | | 345/175 |
| 2013/0148196 A1 | 6/2013 | Arnold | |
| 2013/0194458 A1 | 8/2013 | Nayar et al. | |
| 2015/0160002 A1* | 6/2015 | Nayar | G01B 11/25 |
| | | | 356/610 |

FOREIGN PATENT DOCUMENTS

| | | |
|---|---|---|
| CN | 104079827 A | 10/2014 |
| WO | WO-2013025842 | 2/2013 |

OTHER PUBLICATIONS

"Second Written Opinion Issued in PCT Application No. PCT/US2016/026301", dated Sep. 22, 2016, 5 Pages.
"International Search Report and Written Opinion", Application No. PCT/US2016/026301, dated Jul. 20, 2016, 12 pages.
Cossairt,"Diffusion-Coded Photography for Extended Depth of Field", ACM Transactions on Graphics, dated Jul. 1, 2010, 10 pages.
Gautier,"Efficient Depth Map Compression Based on Lossless Edge Coding and Diffusion", In Proceedings: Picture Coding Symposium, Krakow, Poland, May 7, 2012, 4 pages.
Namboodiri,"Novel Diffusion Based Techniques for Depth Estimation and Image Restoration from Defocused Images", In proceedings: Thesis paper, Department of Electrical Engineering, Indian Institute of Technology—Bombay Available at: <https://www.ee.iitb.ac.in/~sc/papers/vinay_thesis.pdf>, 2008, 135 pages.
Stefanoski,"Depth Estimation and Depth Enhancement by Diffusion of Depth Features", In Proceedings of 20th IEEE International Conference on Image Processing, Sep. 15, 2013, 5 pages.
Zhou,"Depth from Diffusion", In Proceedings: IEEE Conference on Computer Vision and Pattern Recognition (CVPR), Jun. 2010, 8 pages.
"International Preliminary Report on Patentability Issued in PCT Application No. PCT/US2016/026301", dated May 19, 2017, 6 Pages.
"First Office Action Issued in Chinese Patent Application No. 201680026304.2", dated Dec. 31, 2019, 16 Pages.

* cited by examiner

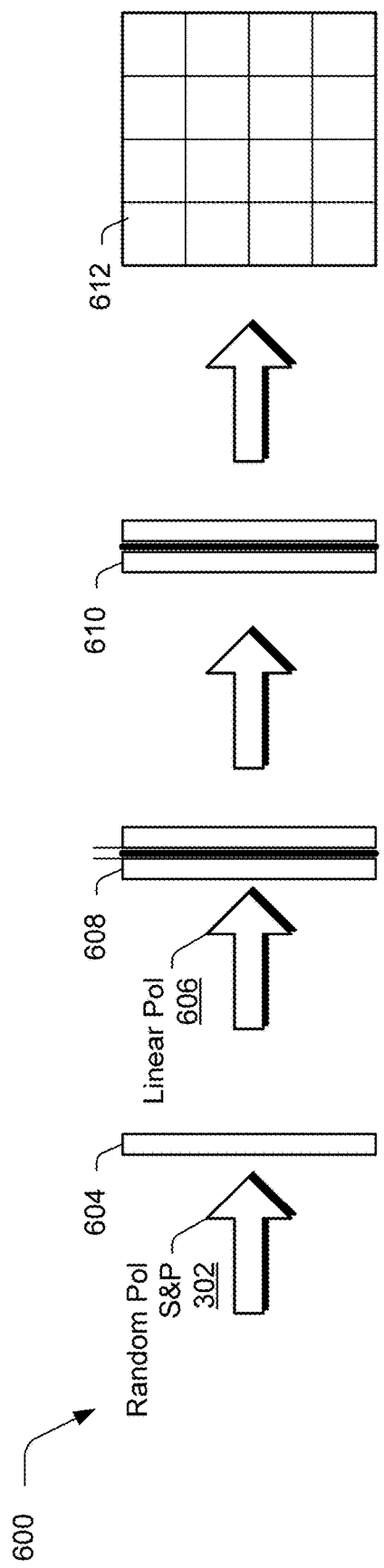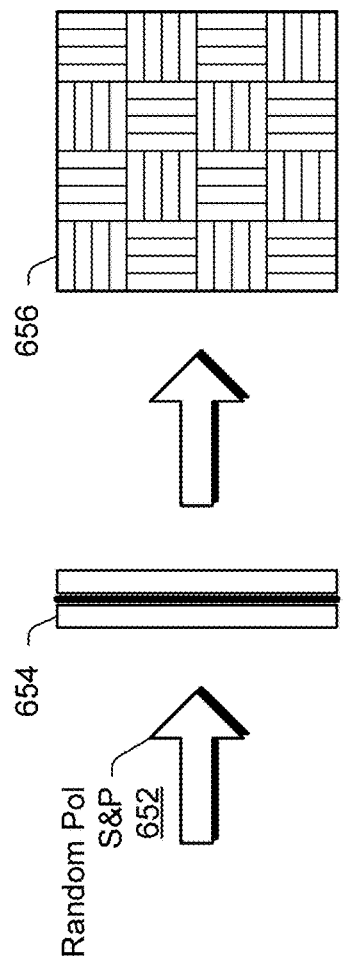

1200 →

```
┌─────────────────────────────────────────────────────────────┐
│                           1202                              │
│ Receive one or more images by the computing device of an    │
│ image scene from an image capture system having diffusion   │
│ applied internally by the image capture system              │
└─────────────────────────────────────────────────────────────┘
                              │
                              ▼
┌─────────────────────────────────────────────────────────────┐
│                           1204                              │
│ Determine a distance to one or more objects in the image    │
│ scene by the computing device based on an amount of         │
│ blurring exhibited by the one or more objects in the        │
│ received images                                             │
└─────────────────────────────────────────────────────────────┘
                              │
                              ▼
┌─────────────────────────────────────────────────────────────┐
│                           1206                              │
│ Output the determined distance by the computing device      │
└─────────────────────────────────────────────────────────────┘
```

*Fig. 12*

REMOTE DEPTH SENSING VIA RELAYED DEPTH FROM DIFFUSION

BACKGROUND

Depth sensing may be utilized by computing devices to support a variety of different functionality. For example, conventional techniques such as of time-of-flight cameras, structured-light cameras, and so on may be used to determine a location of an object within an object scene in two-dimensional space (i.e., "X" axis and "Y" axis) as well as a depth of the object from a camera that captures the image, i.e., a "Z" axis. This may be used to map an object space in three dimensions, detect gestures as part of a natural user interface (NUI), and so forth.

There are primarily two kinds of imaging techniques utilized for generating depth images—passive and active. Passive depth cameras are reliant on the amount of texture information present in the scene, and it is challenging to achieve reliable performance in diverse environments. Active depth cameras, on the other hand, have significantly higher reliability as these cameras estimate depth information by measuring response to a light source that is part of the system. Conventional time-of-flight techniques utilized to perform depth sensing, however, require high powered and high frequency illumination and are susceptible to multipath degradation, as these techniques are based on timing of reflected light back to a custom image sensor. The customization of the sensor also adds significant cost to the device. Conventional structured-light cameras, on the other hand, require calibration against a diffraction optical element (DOE) and there are stringent requirements on maintaining this calibration through the life of the system for guaranteeing correct depth. This calibration requirement makes it hard to implement structured light depth systems in products that might undergo significant mechanical and thermal distortions—such as mobile products. Additionally, the depth spatial resolution is dependent on the spacing of the dots in the DOE pattern, and there is often a tradeoff between resolution and being able to identify each dot from a very dense pattern. Depth from defocus is another technique that makes use of known lens properties to infer depth based on the amount of defocus/blur rendered by scene points, as such blur is dependent on depth and lens properties, such as depth of field in object space and depth of focus at sensor. This technique can be implemented in both, active and passive flavors, with the active mode (say, with an illumination systems including a laser and DOE) having the advantage that there will be no dependence on the amount of scene texture, as it is added or overlaid onto the object scene using such structured light illuminator. The challenge for this technique has been that in order to achieve good depth accuracy, a large aperture lens is required which limits viability in mobile products, due to factors including size and weight as well as cost.

SUMMARY

Remote depth sensing techniques are described via relayed depth from diffusion. In one or more implementations, a remote depth sensing system is configured to sense depth as relayed from diffusion. The system includes an image capture system including an image sensor and an imaging lens configured to transmit light to the image sensor through an intermediate image plane that is disposed between the imaging lens and the image sensor. The intermediate plane has an optical diffuser disposed proximal thereto that is configured to diffuse the transmitted light. The system also includes a depth sensing module configured to receive one or more images from the image sensor and determine a distance to one or more objects in an object scene captured by the one or more images using a depth by diffusion technique that is based at least in part on an amount of blurring exhibited by respective objects in the one or more images.

In one or more implementations, a technique is described to perform remote depth sensing of objects in an image scene using diffusion by a computing device. The technique includes receiving one or more images by the computing device of an image scene from an image capture system having diffusion applied internally by the image capture system, determining a distance to one or more objects in the image scene by the computing device based on an amount of blurring exhibited by the one or more objects in the received images, and outputting the determined distance by the computing device.

In one or more implementations, an image capture system includes an imaging lens configured to transmit light from an object scene into an image space including an intermediate image plane, an image sensor configured to capture the transmitted light from the image space to form one or more images of the intermediate image plane through use of an imaging relay, and an optical diffuser disposed within an intermediate image plane between the imaging lens and the image sensor, or further between the imaging lens and imaging relay, the optical diffuser enabling an increase in depth of focus available to the image sensor from the imaging relay, serving as an 'ambient' diffuser for the image space of the object scene, the image space being in proximity to the intermediate image plane.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 6a depicts a system in an example implementation showing a first polarization switching option.

FIG. 6b depicts a system in an example implementation showing a second polarization state based option that supports simultaneous capture of a plurality of polarization states.

FIG. 12 is a flow diagram depicting a procedure in an example implementation in which a technique is described to perform remote depth sensing of objects in an image scene using diffusion by a computing device.

DETAILED DESCRIPTION

Overview

Figure 1:
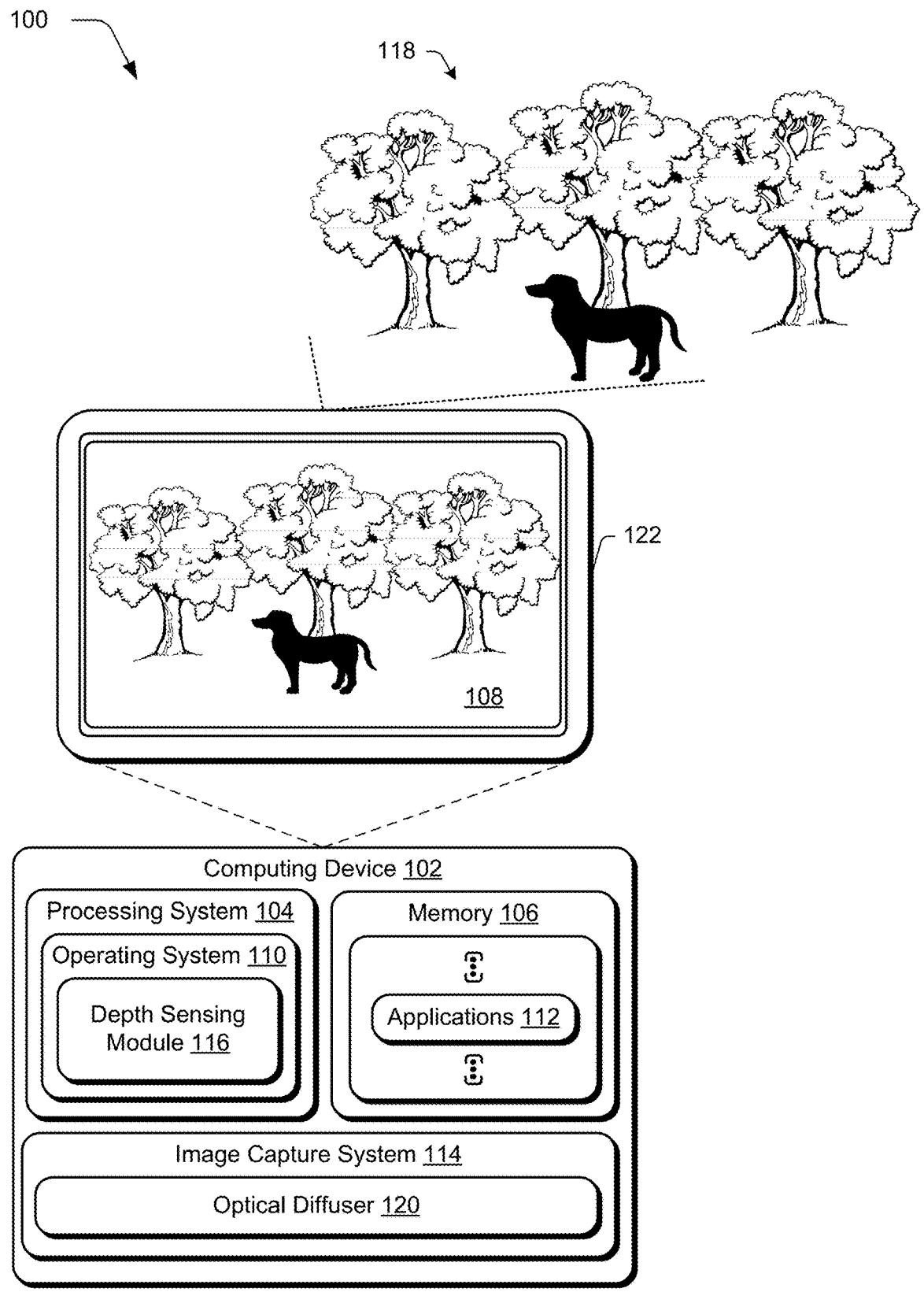
FIG. 1 is an illustration of an environment in an example implementation that is operable to employ the relayed depth from diffusion techniques described herein.

Techniques used to determine depth from diffusion typically have increased accuracy over other conventional techniques such as depth from defocus. Conventional techniques that are utilized to perform depth from diffusion, however, require use of optical diffusers within an object space being examined, and is thus impractical for normal usage scenarios.

Remote depth sensing techniques are described via relayed depth from diffusion. In one or more implementations, an image capture system includes an image sensor used to capture images and an imaging lens configured to transmit light to the image sensor. Between the image sensor and the imaging lens (e.g., between an imaging relay and imaging lens) is an intermediate image plane, at which an optical diffuser is placed. In this way, the conventional remote requirement of the optical diffuser is brought within an image capture system by treating the intermediate image plane as a new ambient object scene. The optical diffuser is switchable between a state to cause diffusion to light transmitted through the diffuser and a state that does not cause diffusion to the light transmitted through the diffuser.

Since the diffuser plane may be fixed relative to main lens, and a lower acceptance lens may be used for the imaging relay, such system is not as impacted by non-telecentric character in proximity to the intermediate image plane, as long as the chief cone NAs of both imaging lens and imaging relay have overlap, such that the smaller acceptance cones of the imaging relay are substantially filled for all field locations within active sensor area, and the diffuser angular exit numerical aperture is strong enough to re-scatter light from substantially all content at diffuser plane, blurred or focused, into the acceptance of the imaging relay. The imaging relay may include a typical multiple lens element imaging relay, or a microlens array based imaging relay which may serve to reduce system length, and may be composed of multiple layers of microlens array layers in order to provide erect 1-to-1 relay imaging.

A depth sensing module receives images captured by the image sensor and senses relative depth of objects in the object scene that is relayed via diffusion. For example, the amount of blurring caused by the optical diffuser to the objects is proportional to a distance of the object from the optical diffuser that is disposed internally within the image capture system. In this way increased accuracy of depth from diffusion techniques may be leveraged in common usage scenarios by avoiding a conventional requirement of placing the optical diffuser in the object space along with the objects, i.e., outside the camera. Additionally, these techniques may be performed with off the shelf imaging lens, imaging relay and image sensors and thus forgo conventional requirements of expensive dedicated hardware, thus saving cost to a device that employs these techniques. Other examples are also contemplated, further discussion of which is included in the following sections and shown in corresponding figures.

Another advantage of diffusion techniques over conventional defocus is that a large aperture lens is not required to achieve the same resolution. That said, for the case of relayed depth from diffusion, this advantage appears to be primarily in the imaging relay, as the main imaging lens has enough aperture to create a different sized footprint of the defocused content representing various object z conjugate distances. By having a differential combination of moderate F/#, such as F/2.5, for imaging lens, and a high (lower cost) F/# for imaging relay, such as F/4 or higher, the image sensor may see a larger depth of focus for both states, which is advantageous for the non-diffuser state in order to have larger depth of field, thus greater depth of objects in focus over full range, while main imaging lens has lower F/# in order to increase cone numerical aperture in order to enable distinction in blur size versus object z conjugate distance. Accordingly, a high enough cone numerical aperture from main imaging lens may be used to form footprint defocus variation or distinct blur among various image conjugate content, while using a lower cone numerical aperture for imaging relay, in order to ensure larger depth of focus at sensor, or larger depth of field for the image space content in proximity to intermediate image plane.

Thus, although the following discussion describes use of an intermediate image plane and diffusion for depth sensing, these techniques are applicable to a wide range of other uses. For example, an intermediate image plane may be used to reduce depth of field for low NA, high DOF imaging, e.g., to mimic an effect of a high NA imaging system. In another example, because an optical diffuser scatters light rays transmitted through the diffuser, the diffuser may be used to increase an effective aperture of an optical system, e.g., a relay lens for an image sensor. This example may thus enable lower-aperture lens systems to be used in mobile communication devices (e.g., mobile phones), thereby conserving cost and increasing utility of the device by reducing an aperture of a lens of a camera used to capture the images.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ the relayed depth from diffusion techniques described herein. The illustrated environment 100 includes a computing device 102, which may be configured in a variety of ways.

For example, a computing device may be configured as a dedicated image capture device (e.g., a camera), a computer that is capable of communicating over a network, such as a desktop computer, a mobile station, an entertainment appliance, a set-top box communicatively coupled to a display device, a wireless phone, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). Additionally, although a single computing device 102 is shown, the computing device 102 may be representative of a plurality of different devices, such as multiple servers utilized by a business to perform operations such as by a web service, a remote control and set-top box combination, an image capture device and a game console configured to capture gestures that do not involve touch, and so on.

The computing device 102 is illustrated as including a variety of hardware components, examples of which include a processing system 104, an example of a computer-readable storage medium illustrated as memory 106, a display device 108, and so on. The processing system 104 is representative of functionality to perform operations through execution of instructions stored in the memory 106. Although illustrated separately, functionality of these components may be further divided, combined (e.g., on an application specific integrated circuit), and so forth.

The computing device 102 is further illustrated as including an operating system 110. The operating system 110 is configured to abstract underlying functionality of the computing device 102 to applications 112 that are executable on the computing device 102. For example, the operating system 110 may abstract processing system 104, memory 106, network, and/or display device 108 functionality of the computing device 102 such that the applications 112 may be written without knowing "how" this underlying functionality is implemented. The application 112, for instance, may provide data to the operating system 110 to be rendered and displayed by the display device 108 or printer without understanding how this rendering will be performed. The operating system 110 may also represent a variety of other functionality, such as to manage a file system and user interface that is navigable by a user of the computing device 102.

The computing device 102 is also illustrated as including an image capture system 114 and a depth sensing module 116. The image capture system 114 is representative of functionality to capture images of an object scene 118, examples of which are illustrated as a dog and trees as objects in the object scene 118. The image capture system 114 may thus include a lens system and image sensor (e.g., a charge coupled device), an example of which is shown in greater detail in FIG. 2. In one or more implementations, the image capture system 114 may also include specialized depth sensing hardware, such as to support a structured-light depth detection technique through use of a structured-light projector as further described below and thus may utilize light that is visible or not visible to the human eye.

The depth sensing module 116 is representative of functionality to sense remote depth of objects in the object scene 118 using diffusion. For example, the image capture system 114 includes an optical diffuser 120 that is configured to introduce an amount of diffusion (e.g., scatter) to light transmitted internally to the image capture system 114, which is captured as part of the images taken by the image capture system 114. The amount of diffusion introduced to individual objects in the object scene captured as part of the image is proportional to a distance between the objects and the optical diffuser. In this way, the depth sensing module 116 is able to perform depth sensing via relayed depth by the amount of diffusion of the objects internally to the image capture system 114, and thus also internally within a housing 122 of the computing device 102 as a whole. In this way, the depth by diffusion techniques described herein may be employed while avoiding use of external diffusers within the object scene 118 as is required in conventional techniques. Further discussion of the image capture system 114 and optical diffuser 120 is described in the following system and shown in a corresponding figure.

Figure 2:
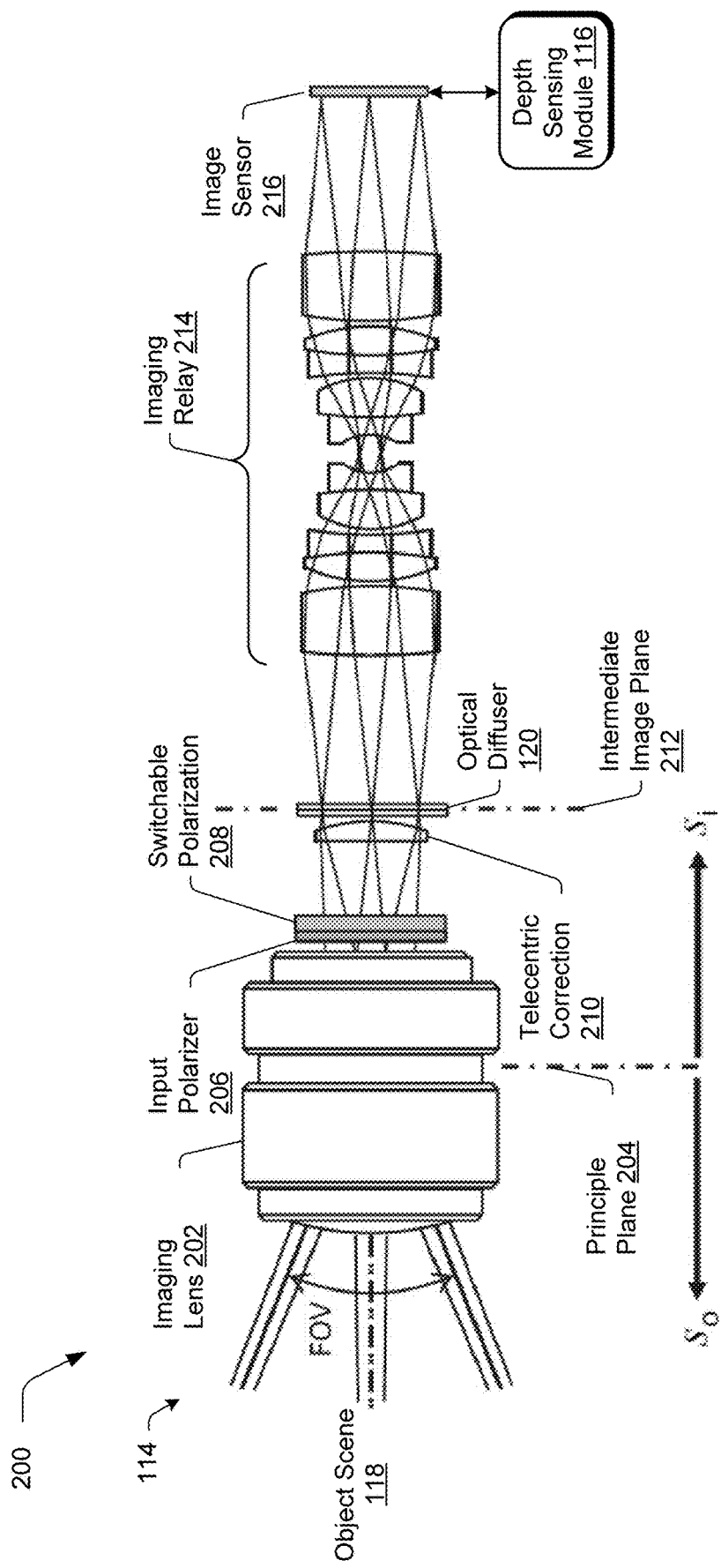
FIG. 2 depicts a system in an example implementation showing an image capture system of FIG. 1 in greater detail as capturing an image of an object scene.

FIG. 2 depicts a system 200 in an example implementation showing the image capture system 114 of FIG. 1 in greater detail as capturing an image of the object scene 118. The image capture system 114 in this instance captures light from the object space 118, a path of which is illustrated using lines in the figure. The light is transmitted through one or more imaging lenses 202 forming a principal plane 204, then through an input polarizer 206 and switchable polarization 208 and telecentric correction 210 to form an intermediate image plane 212. The optical diffuser 120 is disposed proximal to the intermediate image plane 212. Light then passes through an imaging relay 214 to an image sensor 216 for processing by a depth sensing module 116. The image sensor 216 thus captures images that are communicated to the depth sensing module 116 for a variety of uses, such as traditional image capture (e.g., photos or videos), depth sensing, and so forth. Note that both input polarizer 206 and switchable polarization 208, such as an electrically switchable polarization rotator, may be placed in alternate locations along the optical system path, such as (1) before main imaging lens or (2) after telecentric correction 210, as long as input light transmits through input polarizer 206 prior to switchable polarization 208 and such polarized transmitted light transmits through switchable polarization 208 prior to intermediate image plane for best results.

The image capture system 114, for instance, leverages diffusion added to transmitted light at the intermediate image plane 212 for depth sensing via relayed depth from diffusion, e.g., by generating a three-dimensional "Z" map of the object scene 114. The intermediate image plane 212 is formed at least in part by a lens that performs telecentric correction 210, e.g., to perform lens acceptance matching of the imaging lens 202. In this way, the image capture system supports support formation of an intermediate image plane 212 within the optical diffuser disposed proximally thereto that acts as a filter plane within the image capture system 114 with an optical diffuser 120 included near the intermediate image plane 212. This supports depth sensing using visible light, monochrome or color sensors.

The optical diffuser 120, which may include a variety of diffusion output profiles, may diffuse one state of input light polarization, while an orthogonal input light polarization state is allowed to transmit undiffused. In order to limit the impact of motion blur, images of both states may be captured in an alternating manner by fast time-sequential imaging.

The optical diffuser 120 is configurable in a variety of ways to introduce diffusion to the transmitted light. This may include use of mechanical (e.g., rotation) or electrical switches to enable polarized input light to transmit either diffuse or non-diffuse states through a polarization-dependent diffuser onto the image sensor 216 using the relay lens 210. In an electrical example, a fast polarization rotator, such as a ferroelectric liquid crystal cell or alternative liquid crystal-based switcher, in conjunction with polarized input light may be used such that alternate frames include alternating diffuse and non-diffuse states. Input light may be polarized by a typical film polarizer, such as Polaroid film, or a wire grid polarizer, the latter being useful for broadband applications or narrowband applications using near infrared (NIR) light. The optical diffuser 120, for instance, may be configured to have a random surface relief, alternating optical angular spreaders, an axicon array, prismatic array, diffraction grating, micro lens array, both one and two-dimensional versions of each, and so on. Further, both states may be captured simultaneously by making use of a patterned polarizer aligned and registered over the sensor array cells, such that alternating, interstitially spaced, pixels detect orthogonal polarization states. Additional examples of optical diffuser configurations are described in relation to FIGS. 3-6 in the following discussion.

Structured light may be added to improve detection of some difficult situations, such as flat walls. Further, combination and/or sequential capturing of content with and without structured light may enable color content as well as improved depth resolve. To further improve signal to noise, and filter out ambient object space light having wavelengths which are outside the band of the illumination light source, a bandpass filter may be utilized to limit input light that transmits to the image sensor to be within a range of wavelengths substantially overlapping with the illumination range of wavelengths, which may be laser source based, such as a speckle pattern or dot pattern, or light projection.

Additionally, since the relayed image is utilized, object distance and image distance follow a nonlinear relationship based on optical imaging conjugate distances. This aspect provides a realistic representation of what is perceived by the human eye, since depth resolution inherently increases for close objects and reduces for objects at a far distance. This enables capture of a larger content range compared with linear systems, which may be more efficient for some scenarios involving long-range perspective. Linear systems are also contemplated without departing from the spirit and scope thereof.

Figure 3:
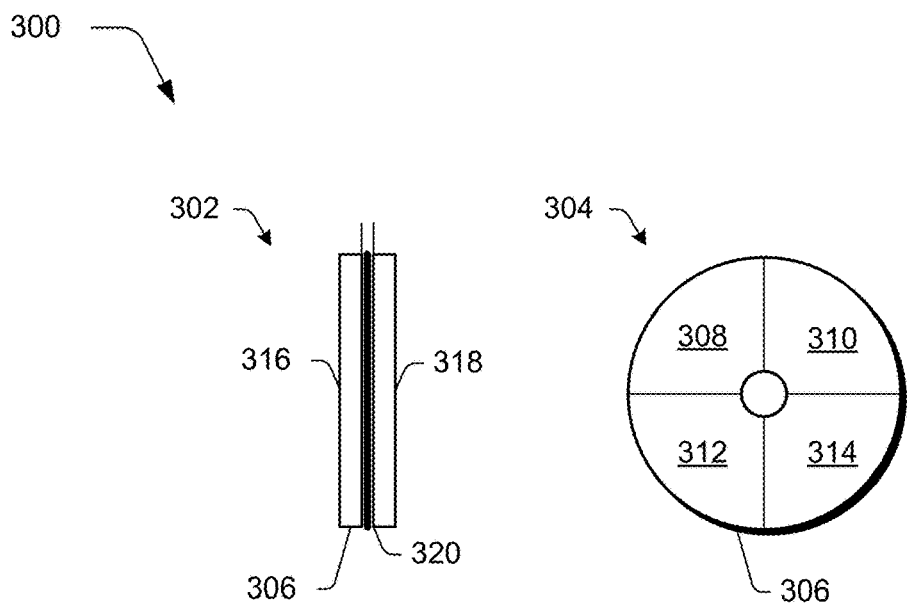
FIG. 3 depicts an example implementation of a diffuser of FIG. 2 that is configured to mechanically switch between polarized and non-polarized states.

FIG. 3 depicts an example implementation 300 of the optical diffuser 120 of FIG. 2 that is configured to mechanically switch between polarized and non-polarized states. This example implementation 300 includes side and front views 302, 304 of an optical diffuser 306. The optical diffuser 306 in this example is configured to rotate such that light transmitted through the image capture system 114 is transmitted through different portions 308, 310, 312, 314 of the optical diffuser 306 at different points in time. The portions 308-314, for instance, may alternate between functionality to diffuse light and not diffuse light, may include different amounts of diffusion, have diffusion layers embedded at different z placements within laminated stack for each portion, and so on. The rotation of the optical diffuser 306 in this instance is thus synchronized with images captured by the image sensor 216 in order to perform depth sensing.

The optical diffuser 306 as shown in the side view 302 includes first and second substrates 316, 318 having a material 320 disposed between that is configured to provide the diffusion as desired. The material disposed between may be volume scattering media in mismatched index, or include one or two relief surfaces on one or both of the inner-facing faces of the two laminated substrates, being laminated by adhesive having refractive index which differs from refractive index of the surface relief surface or surfaces. Thus, diffusion performed by the material of the optical diffuser 306 may be passive in this instance due to the mechanical rotation of the optical diffuser 306 although active instances are also contemplated, such as an electrically switchable liquid-crystal cell. Other electrically switchable examples are also contemplated in which the optical diffuser does not move and switching is performed between diffuse and non-diffuse states, such that the system has no moving parts, an example of which is described in the following and shown in a corresponding figure.

Figure 4:
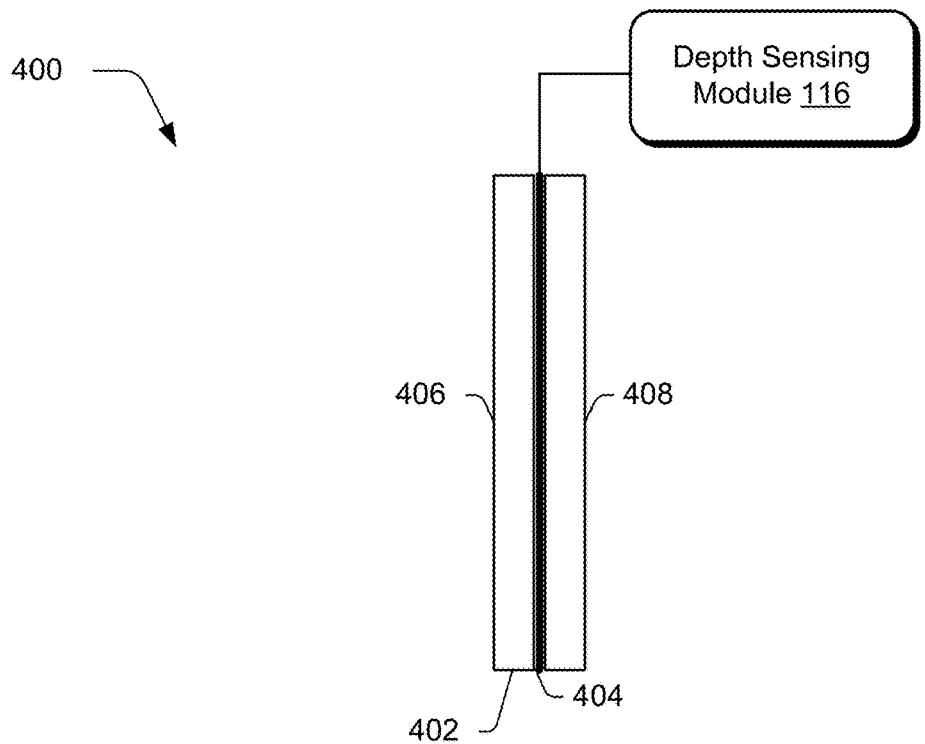
FIG. 4 depicts an example implementation of the optical diffuser of FIG. 2 that is configured to electrically switch between polarized and non-polarized states.

FIG. 4 depicts an example implementation 400 of the optical diffuser 120 of FIG. 2 that is configured to electrically switch between polarized and non-polarized states. The optical diffuser 402 in this example is a polarization-dependent diffuser formed by embedding a liquid-crystal layer 404 between two substrates 406, 408, with at least one of the substrates 406, 408 having a surface relief topography on the inner layer adjacent to the liquid-crystal layer 404. Thus, the optical diffuser 404 is switchable electrically by the depth sensing module 116 between polarized and non-polarized states to diffuse or not diffuse light transmitted there through.

Figure 5:
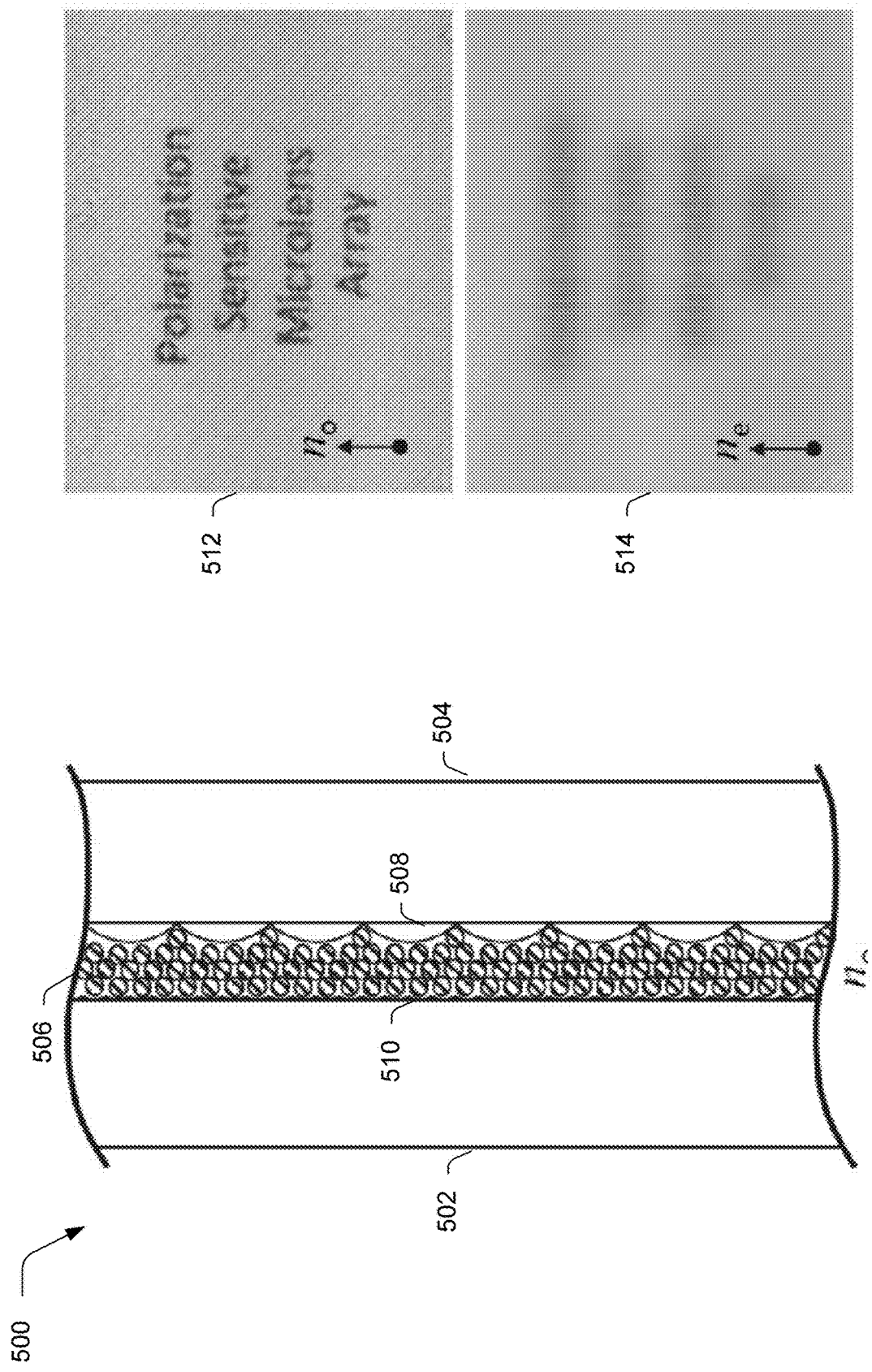
FIG. 5 depicts a system in an example implementation of a polarization-sensitive microlens array and polarization-sensitive diffuser.

FIG. 5 depicts a system 500 in an example implementation of a polarization-sensitive microlens array and polarization-sensitive diffuser. The system 500 includes a liquid-crystal alignment substrate 502 and a diffuser substrate 504. Disposed between the substrates is liquid crystal 506 and a microlens array 508 or diffuser surface relief. The liquid-crystal alignment substrate 502 includes a fine linear groove structure 510 for alignment of liquid crystal orientation, e.g., a rubbed surface, grating (i.e., surface having a 1 μm pitch optical grating), molded substrate, replicated-on substrate, and so on. Examples of use of the system include a first example 512 in which input polarization is aligned to a non-diffuse state and a second example 514 I which input polarization is aligned to a diffuse state.

To null or minimize diffusion & scatter (for non-diffuse state) due to diffusing surface features, a surface relief media refractive index is matched to liquid crystal ordinary index, $n_o$. Since long axis of liquid crystal inherently aligns to groove features of alignment substrate, the extraordinary index axis aligns along the grooves. Thus, when input polarized light is oriented in no axis the diffuser does not scatter light. For orthogonal polarized input light, having polarization oriented in $n_e$ axis, light is scattered by the diffuse character defined by both a profile of surface relief and index differential between the extraordinary refractive index $n_e$ and surface relief media refractive index, set to match $n_o$.

Various surface relief profiles may be used to achieve a rescattering effect at the diffuser plane, such as a Gaussian diffuser, based on random surface relief (or limited-random, pseudo-random), a microlens array (MLA), axicon array (array of cones), and may be one-dimensional or two-dimensional in angular spread character. While a physical wheel or moving plate, having diffuse and non-diffuse regions, may be used to achieve the diffuse and non-diffuse states, use of a polarizer to polarize the input light along with an electrically-switchable liquid crystal polarization rotator to switch between orthogonal polarization states may enable solid state active time-sequential system having no moving parts.

FIG. 6a depicts a system 600 in an example implementation showing a first polarization switching option. In this example, random polarization S&P light 602 is filtered by a linear polarizer 604 that results in linearly polarized light 606. The linearly polarized light 606 is then transmitted through an electrically switchable liquid-crystal polarization rotator 608 and a polarization-sensitive diffuser 610 for capture by a 2× speed image sensor 612 to capture alternating diffused and non-diffused images for processing by the depth sensing module 116.

FIG. 6b depicts a system 650 in an example implementation showing a polarization option that supports simultaneous capture of a plurality of polarization states. In this example, random polarization S&P light 652 is also transmitted through a polarization-sensitive diffuser 654. The image sensor 656 is configured to support simultaneous capture of both diffuse and non-diffuse states using alternation portions, e.g., as a patterned wire grid polarizer array aligned and registered with, and just over or before, the pixels of the image sensor to avoid motion artifacts. Although not shown, both layouts includes a main lens and optical relay with polarization-dependent diffuser placed near intermediate image plane formed by the main lens as described in relation to FIG. 2.

As described above, in a conventional diffusion setup an optical diffuser is placed between the objects in a scene and a camera, and a blurred image is captured with the diffuser, while a non-blurred imaged is captured without the diffuser. For a given diffuser strength having a given or known angular exit profile, the amount of the blur of objects in scene image depends on the z separation distance between the diffuser and objects in scene. This implies that an image of the field of view is composed of a number of different sized blurs each representing a different angle within the field of view. In other words, the diffused image includes the non-diffused scene image convolved with different diffuser blur sizes corresponding to each pixel location within a field of view of the image.

The size of the diffuse blur corresponding to each pixel is determined in order to deduce the depth information, which may include use of a number of algorithms to estimate and map a diffuse blur size map. This is then translated into a z map due to knowledge of the diffuser exit angle profile angular size and intensity shape. Such a system, though, is limited in usage as the diffuser must be placed in the scene in front of but near objects in scene, so the system is not self-contained.

In order to enable such a strategy to provide a z map for the case of relayed depth from diffuser, which is self-contained as shown in FIG. 2, the image of scene imaged through the imaging lens 202 is treated as the new object scene from which both diffuse and non-diffuse images are captured by applying an appropriate fine-featured diffuser near the intermediate image plane 212. Since the conjugate z distances at the image, or new object scene, are related approximately by a thin lens equation, there is now a nonlinear mapping between the resulting image space z map inferred from diffuse blur size map, and the actual final z map, thereby representing the real object scene 118.

The final depth (i.e., "z") map is then calculated by applying this lens equation relationship, which describes the mapping of real object z distances to imaged conjugate z distances after being imaged through the imaging lens 202, thus translating an image space z map into a final z map. Alternatively, the amount of blur of objects in scene between states may be assessed and calibrated against known object distances in order to close the loop on object z mapping.

Note that since the imaged object scene becomes the object scene input to depth from diffusion, the optical diffuser 120 location may be placed at any z distance relative to the imaged object scene. In some cases, diffuse and non-diffuse images may be captured for optical diffusers placed at multiple diffuser planes, which may improve resolve and/or sensing depth capability. Since the imaged object scene images objects at infinity distance at lens focal length, and closer object distances are dictated by the imaging conjugates (e.g., on order with a thin lens equation), the image space z map resolution increments become non-linear with z distance from lens. This effect can be useful in scenarios where high dynamic range in z is desirable, and higher resolve is desired closer to image capture system 114. One such scenario is designed to mimic human eye response or z resolve expectations based on perspective distance, where more resolve is desired close to an eye, and progressively less resolve increment in z for far distances, due to depth of field.

Figure 7:
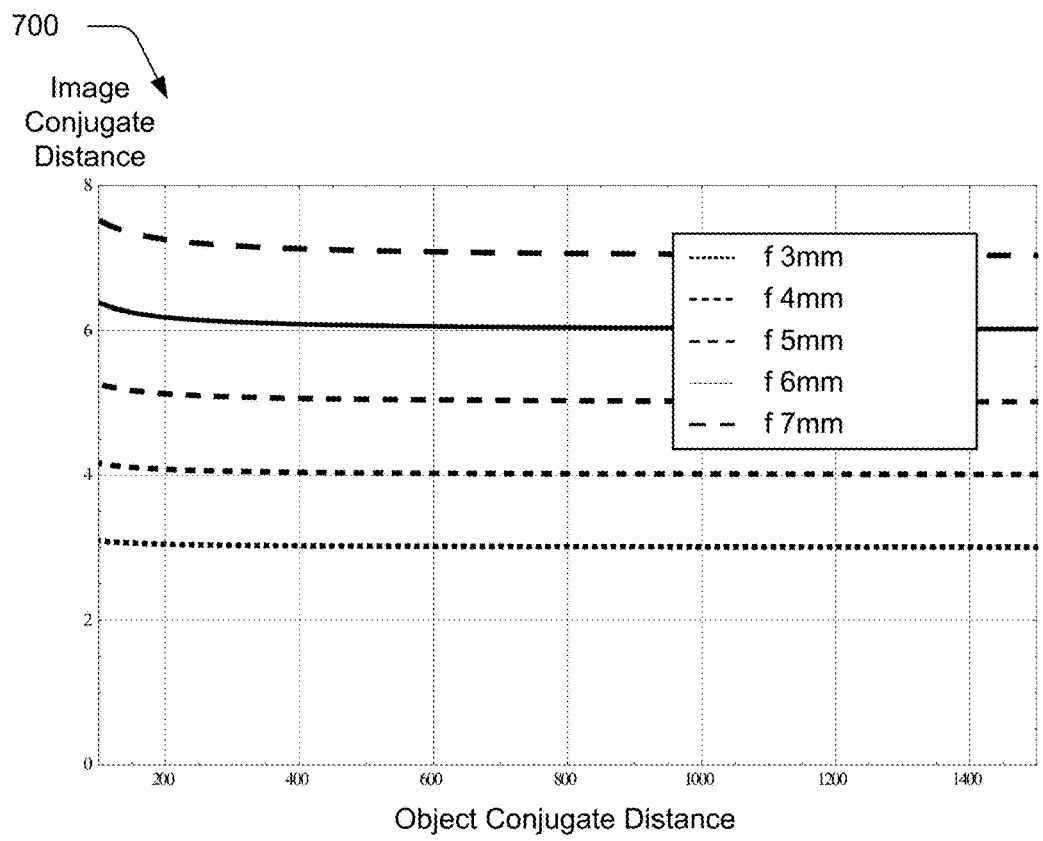
FIGS. 7 and 8 depict graphs illustrating examples of nonlinear mapping to a z distance deduced by the depth from diffusion techniques which follows optical image conjugates of the image capture system of FIG. 2.
Figure 8:
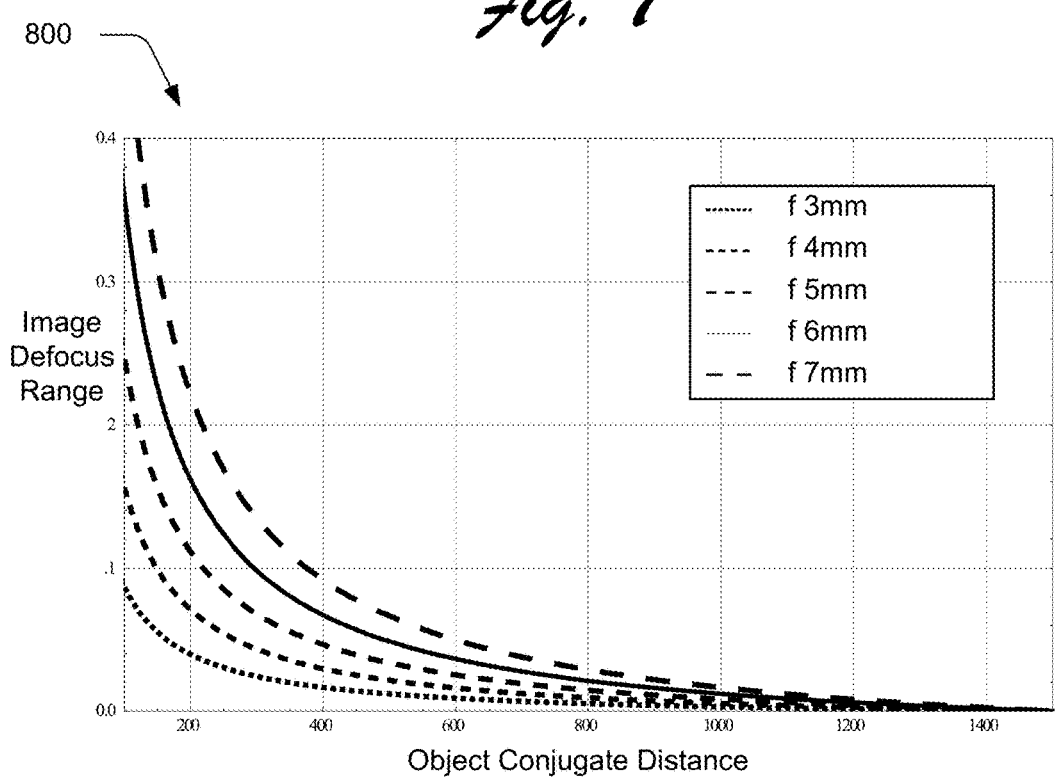

FIGS. 7 and 8 depict graphs 700, 800 illustrating examples of nonlinear mapping to the z distance deduced by the depth from diffusion techniques which follows optical image conjugates of the image capture system 114. For the graph 700 of FIG. 7, an imaging lens 202 having focal length of six millimeters is used along with an embedded diffuse strength approaching 10° FWHM. The linear incremented z distances at or near the intermediate image plane then correspond to image conjugate distances in the object space portraying the relationship close to an imaging lens relationship. For f=6 mm, the images captured object content from 100 millimeters away to as much as five to six meters away from the image capture system 114. Thus, FIG. 7 illustrates the relationship between linear incremented z distance at intermediate image plane and the real object space for various imaging lens focal lengths.

A change of focal length of the imaging lens 202 can enable not only different field of view for the system, but also a change in the nonlinear distance mapping as shown in FIG. 8. FIG. 8 depicts an image defocus range versus object conjugate distance for various imaging lens focal lengths. This nonlinear mapping may be useful for scenarios where it is desirable to mimic human eye perspective in terms of distance resolve vs z distance as described above.

Figure 9:
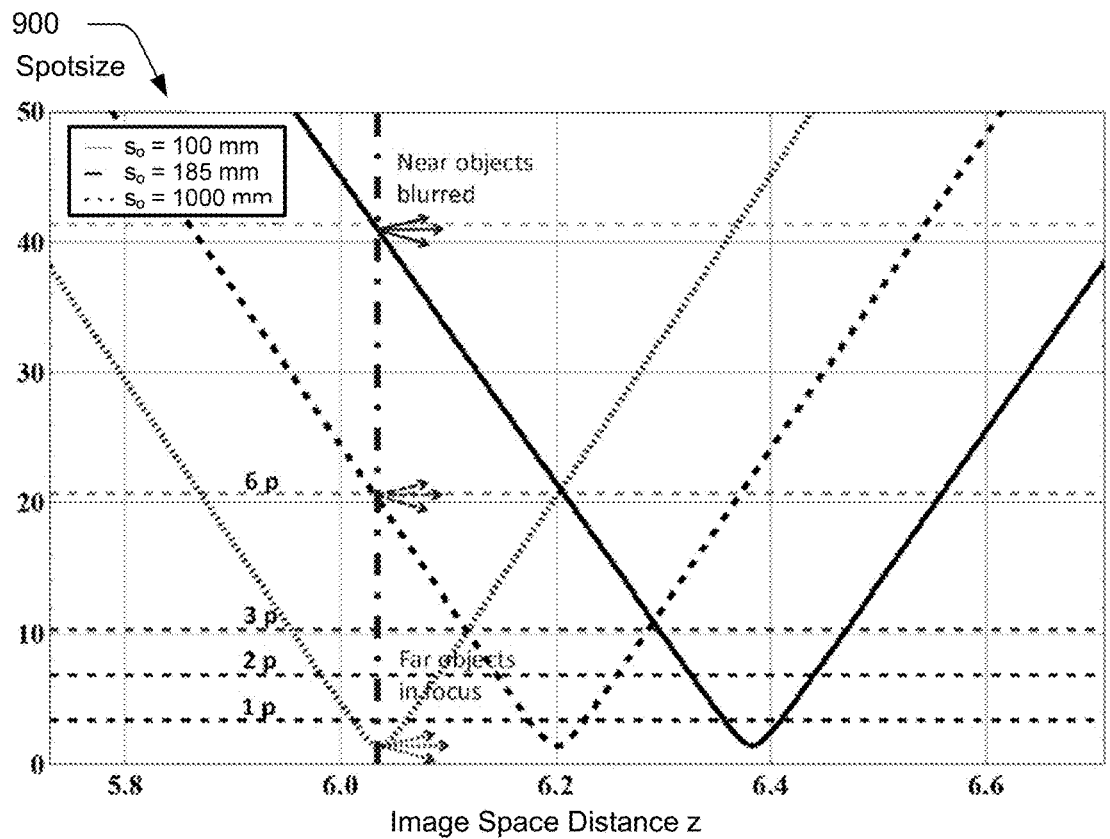
FIG. 9 depicts an example graph of spotsize blur for various object distances for a diffuser placed at image space conjugate for far object distance.
Figure 10:
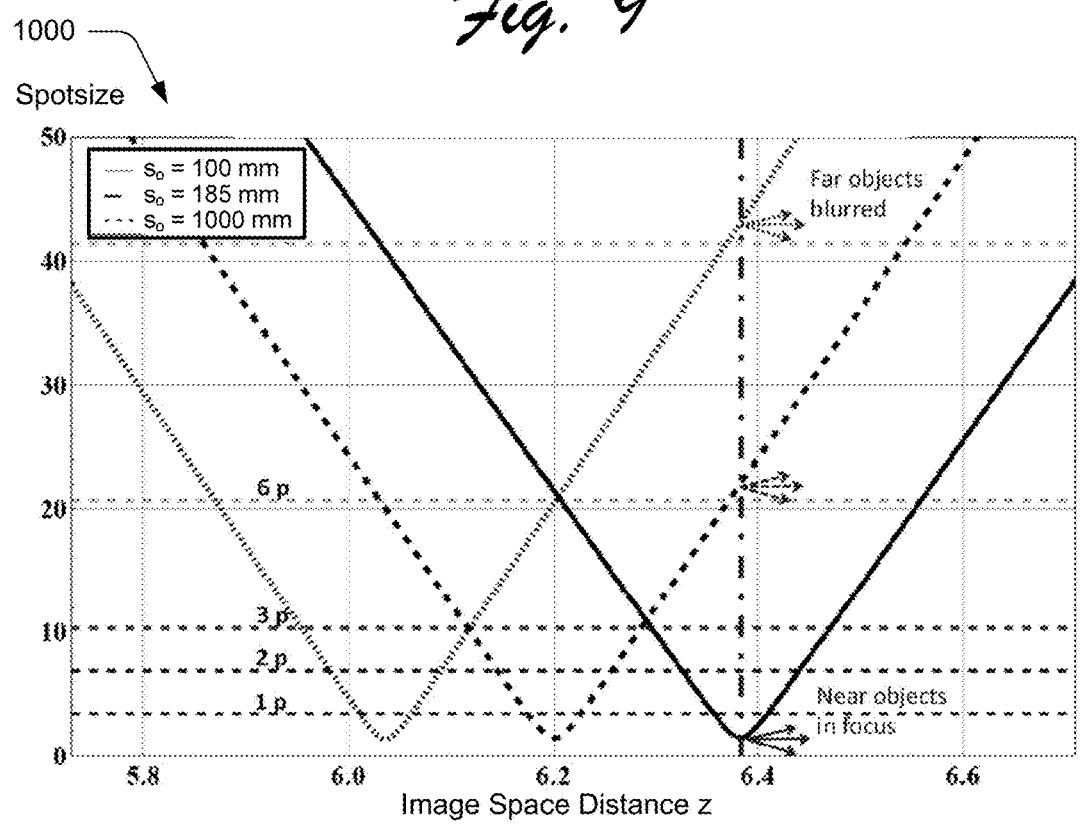
FIG. 10 depicts an example graph of spotsize blur for various object distances for a diffuser placed at image space conjugate for near object distance.

FIG. 9 depicts an example graph 900 of spotsize blur for various object distances for a diffuser placed at image space conjugate for far object distance. FIG. 10 depicts an example graph 1000 of spotsize blur for various object distances for a diffuser placed at image space conjugate for near object distance. When performing a depth from diffusion using a diffuser in the object scene, depth is assessed only for objects which are placed behind the diffuser. However, by imaging the object scene into image space within proximity of an intermediate image plane, multiple diffuser placement options are now possible. Scenarios include (1) placement of diffuser at image space conjugate, or focus, of the object distance representing the far limit of depth sensing range as shown in the graph 900 of FIG. 9, and (2) placement of diffuser at image space conjugate, or focus, of the object distance representing the near limit of depth sensing range as shown in the graph 1000 of FIG. 10.

For the diffuse state, when the optical diffuser 120 is placed at far object image conjugate, relayed image of the diffuser plane shows far object in focus and near objects blurred, whereas when diffuser is placed at the near object image conjugate, relayed image of diffuser plane shows near objects in focus and far objects blurred. Placement of the diffuser in the middle of a desired target range allows blur to have some localized symmetry in positive and negative z directions, thus possible ambiguity and would typically not be desirable, unless the intent is to enable active positioning of an object, perhaps through feedback from the system. While blur symmetry may be utilized, it is expected that useful scenarios include matching best focus for either target z end limits, such as Far or Near, to avoid localized inversion effects due to such focus crossover.

Since the diffuser serves as a plane of scatter centers, or rescattering plane, the footprints of spotsize at the diffuser dictate the relative size of blur in relayed image, and since image conjugate z distance is dependent on object conjugate distance, blur becomes a function of object z distance. Best focus is determined by placement of the diffuser plane within image space, such that best focus and extreme blur end limits are strategically determined by diffuser placement plane, which is then relayed into image at sensor plane.

Strength of the diffuser is important to the extent that diffuser exit angle, or exit numerical aperture, or exit angular profile, are to be large enough to rescatter a portion of image footprints at diffuser plane into the relay lens acceptance to ensure that the blur size is seen at image sensor plane. Matching diffuser exit numerical aperture to main imaging lens numerical aperture may ensure blur size is maintained, whereas too low diffuser exit numerical aperture provides fractional blur amount, or factor, and wastes usage of lens numerical aperture. Reasonable results have been obtained with lens numerical aperture in the F/2 to F/4 range, but other numerical apertures are possible. On the other extreme, if the diffuser exit numerical aperture is substantially larger than imaging lens numerical aperture, then much light may be scattered beyond the acceptance numerical aperture of the relay lens, or relay acceptance, and thus reduce efficiency of the system. For these reasons, for optimal blur effect and high efficiency, choice of diffuser numerical aperture may be based on, and on order of the acceptance of both main imaging lens and relay lens. Light loss for case of using too high exit numerical aperture for diffuse state may be mitigated by compensation of the grey level in image, but it is efficient to ensure capture of all or most of the scattered light through appropriate choice of relay acceptance, and limited or controlled profile of diffuser and/or MLA.

Figure 11:
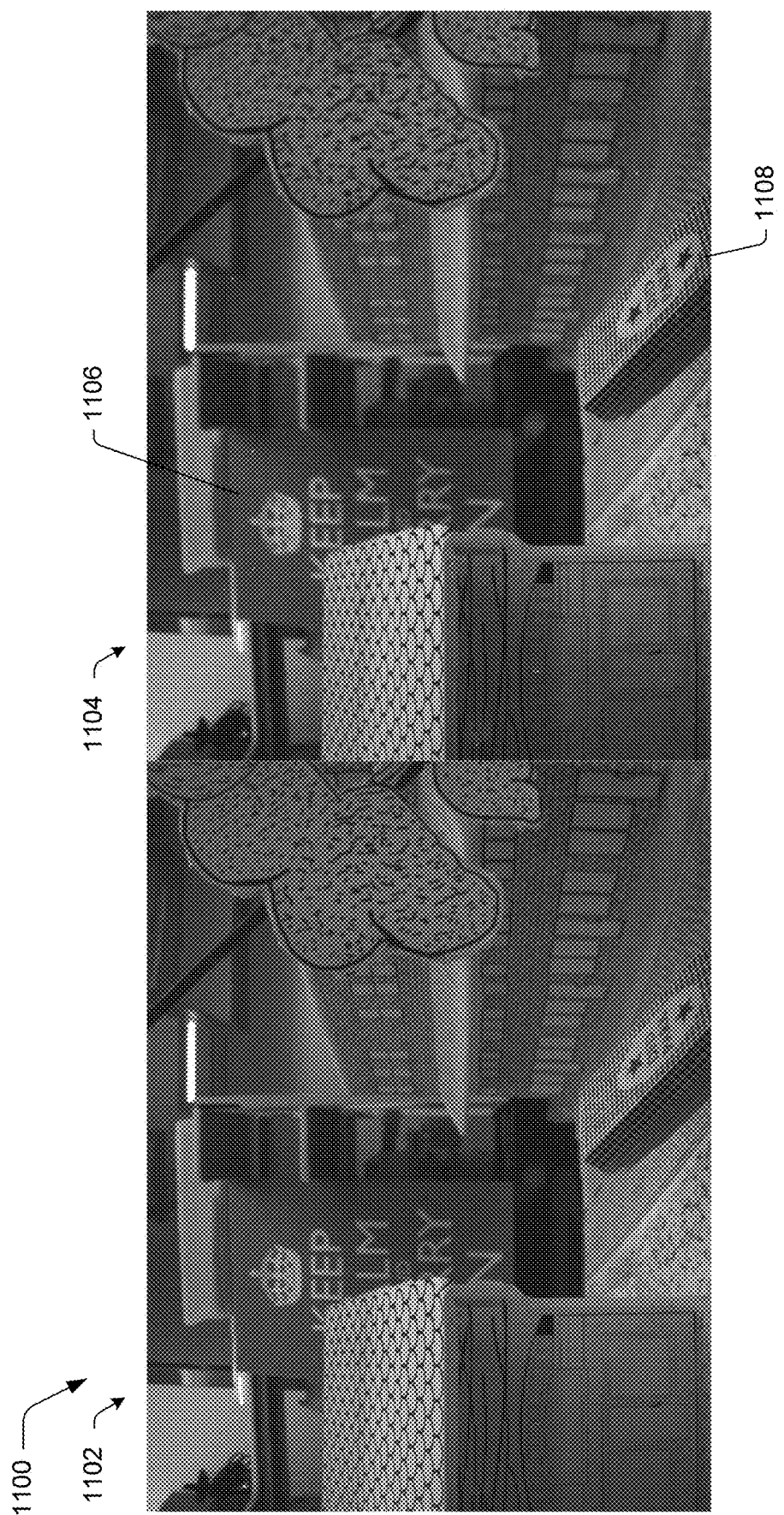
FIG. 11 depicts an example implementation of time-sequential depth from diffusion using a polarization-sensitive microlens array.

FIG. 11 depicts an example implementation of time-sequential depth from diffusion using a polarization-sensitive microlens array. A first example 1102 shows polarization aligned with a non-diffuse state and a second example 1104 shows polarization aligned with a diffuse state. In this example, diffuse state matches best focus at near field, i.e., the optical diffuser 120 is placed for best focus at near object image conjugate, as far objects 1106 (e.g., the sign) have blur but near objects 1108 do not, e.g., the park sign.

Example Procedures

The following discussion describes remote depth sensing via relayed depth from diffusion techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the figures described above.

Functionality, features, and concepts described in relation to the examples of FIGS. 1-11 may be employed in the context of the procedures described herein. Further, functionality, features, and concepts described in relation to different procedures below may be interchanged among the different procedures and are not limited to implementation in the context of an individual procedure. Moreover, blocks associated with different representative procedures and corresponding figures herein may be applied together and/or combined in different ways. Thus, individual functionality, features, and concepts described in relation to different example environments, devices, components, and procedures herein may be used in any suitable combinations and are not limited to the particular combinations represented by the enumerated examples.

FIG. 12 depicts a procedure 1200 in an example implementation in which a technique is described to perform remote depth sensing of objects in an image scene using diffusion by a computing device. One or more images are received by the computing device of an image scene from an image capture system having diffusion applied internally by the image capture system (block 1202). The computing device 102, for instance, may include an image capture system 114 that captures an image of the object scene 118. The image capture system 114 includes an optical diffuser 120 that is disposed proximal to an intermediate image plane 212 that is internal to the system.

A distance to one or more objects in the image scene is determined by the computing device based on an amount of blurring exhibited by the one or more objects in the received images (block 1204). The depth, for instance, may be determined by the depth sensing module 116 to be proportional, but not linear, to the amount of blurring exhibited through a comparison of blurred and non-blurred versions of the images. This is then used to compute a depth map of the object scene 118. The determined distance is output by the computing device (block 1206), such as through part of the depth map. This may be used to support a variety of functionality, such as a natural user interface, object recognition, three-dimensional mapping, and so on.

Example System and Device

Figure 13:
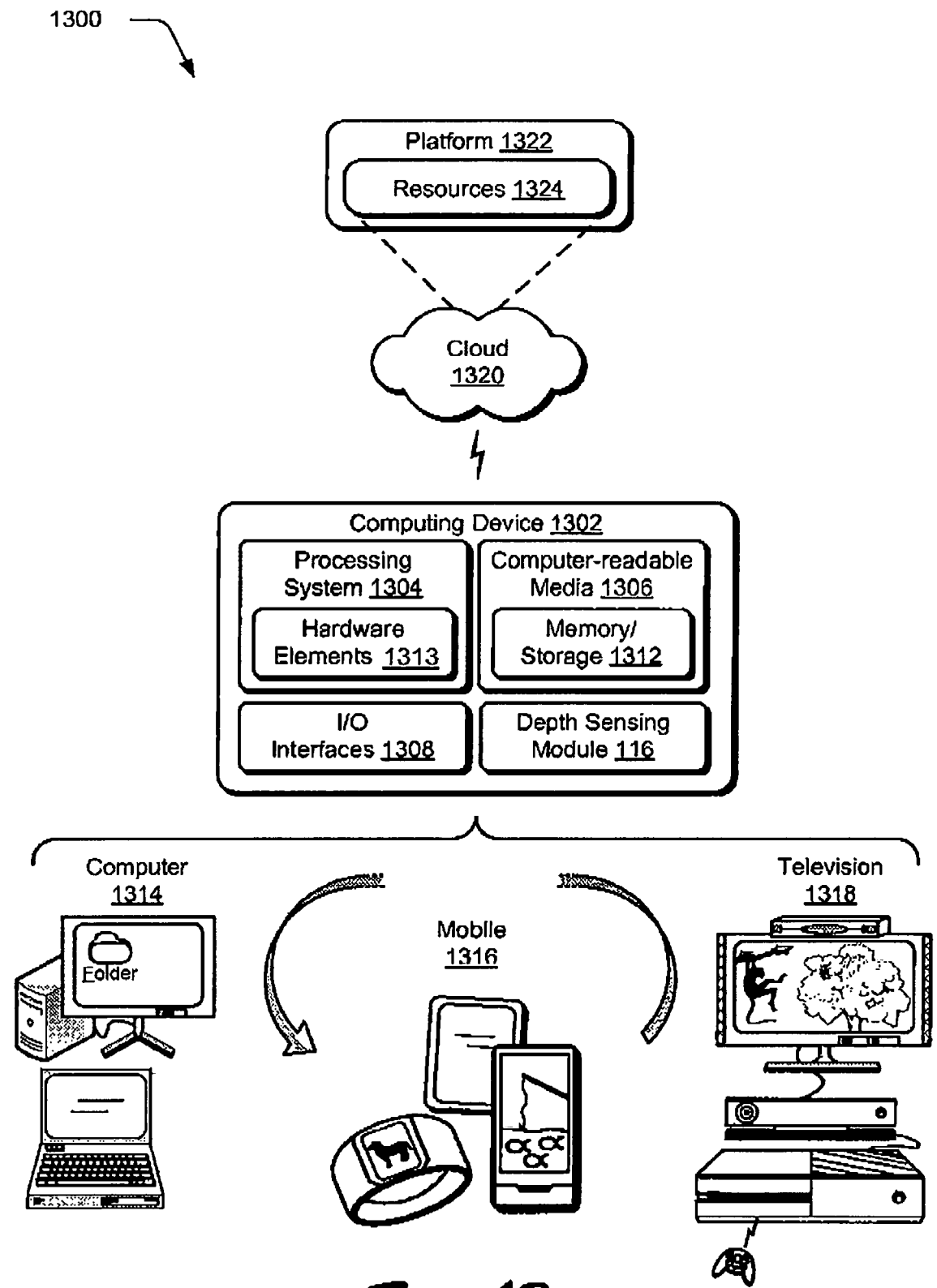
FIG. 13 illustrates an example system including various components of an example device that can be implemented as any type of computing device as described with reference to FIGS. 1-9 to implement embodiments of the techniques described herein.

FIG. 13 illustrates an example system generally at 1300 that includes an example computing device 1302 that is representative of one or more computing systems and/or devices that may implement the various techniques described herein. This is illustrated through inclusion of the depth sensing module 116, and may also include the image capture system 114 and internal optical diffuser 120 of FIG. 1. The computing device 1302 may be, for example, a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interface 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware.

Accordingly, the processing system 1304 is illustrated as including hardware element 1313 that may be configured as processors, functional blocks, and so forth. This may include implementation in hardware as an application specific integrated circuit or other logic device formed using one or more semiconductors. The hardware elements 1313 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1313 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1313. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1313 of the processing system 1304. The instructions and/or functions may be executable/operable by one or more articles of manufacture (for example, one or more computing devices 1302 and/or processing systems 1304) to implement techniques, modules, and examples described herein.

As further illustrated in FIG. 13, the example system 1300 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1300, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1302 may assume a variety of different configurations, such as for computer 1314, mobile 1316, and television 1318 uses. Each of these configurations includes devices that may have generally different constructs and capabilities, and thus the computing device 1302 may be configured according to one or more of the different device classes. For instance, the computing device 1302 may be implemented as the computer 1314 class of a device that includes a personal computer, desktop computer, a multi-screen computer, laptop computer, netbook, and so on.

The computing device 1302 may also be implemented as the mobile 1316 class of device that includes mobile devices, such as a mobile phone, wearables (e.g., wrist bands, pendants, rings, etc.) portable music player, portable gaming device, a tablet computer, a multi-screen computer, and so on. The computing device 1302 may also be implemented as the television 1318 class of device that includes devices having or connected to generally larger screens in casual viewing environments. These devices include televisions, set-top boxes, gaming consoles, and so on. Other devices are also contemplated, such as appliances, thermostats and so on as part of the "Internet of Things."

The techniques described herein may be supported by these various configurations of the computing device 1302 and are not limited to the specific examples of the techniques described herein. This functionality may also be implemented all or in part through use of a distributed system, such as over a "cloud" 1320 via a platform 1322 as described below.

The cloud 1320 includes and/or is representative of a platform 1322 for resources 1324. The platform 1322 abstracts underlying functionality of hardware (e.g., servers) and software resources of the cloud 1320. The resources 1324 may include applications and/or data that can be utilized while computer processing is executed on servers that are remote from the computing device 1302. Resources 1324 can also include services provided over the Internet and/or through a subscriber network, such as a cellular or Wi-Fi network.

The platform 1322 may abstract resources and functions to connect the computing device 1302 with other computing devices. The platform 1322 may also serve to abstract scaling of resources to provide a corresponding level of scale to encountered demand for the resources 1324 that are implemented via the platform 1322. Accordingly, in an interconnected device embodiment, implementation of functionality described herein may be distributed throughout the system 1300. For example, the functionality may be implemented in part on the computing device 1302 as well as via the platform 1322 that abstracts the functionality of the cloud 1320.

CONCLUSION AND EXAMPLE IMPLEMENTATIONS

Example implementations described herein include, but are not limited to, one or any combinations of one or more of the following examples:

Remote depth sensing techniques are described via relayed depth from diffusion. In one or more examples, a remote depth sensing system is configured to sense depth as relayed from diffusion. The system includes an image capture system including an image sensor and an imaging lens configured to transmit light to the image sensor through an intermediate image plane that is disposed between the imaging lens and the image sensor, the intermediate plane having an optical diffuser disposed proximal thereto that is configured to diffuse the transmitted light. The system also includes a depth sensing module configured to receive one or more images from the image sensor and determine a distance to one or more objects in an object scene captured by the one or more images using a depth by diffusion technique that is based at least in part on an amount of blurring exhibited by respective said objects in the one or more images.

An example as described alone or in combination with any of the above or below examples, wherein the optical diffuser is configured to mechanically switch polarization states to diffuse the transmitted light.

An example as described alone or in combination with any of the above or below examples, wherein the optical diffuser is configured to electrically switch polarization states to diffuse the transmitted light.

An example as described alone or in combination with any of the above or below examples, wherein the image capture system includes a linear polarizer and the optical diffuser is a polarization-sensitive diffuser.

An example as described alone or in combination with any of the above or below examples, wherein the polarization-sensitive diffuser includes a laminate structure having an embedded surface relief laminated with an adjacent liquid crystal layer that is aligned to provide diffusion in a polarization state and does not provide the diffusion for an orthogonal polarization state.

An example as described alone or in combination with any of the above or below examples, wherein an optical path difference (OPD) is minimized by the laminate structure between the polarization state and the orthogonal polarization state.

An example as described alone or in combination with any of the above or below examples, wherein the image sensor is configured to capture a plurality of polarization states simultaneously from the optical diffuser.

An example as described alone or in combination with any of the above or below examples, wherein the optical diffuser is configured to have a random surface relief, alternating optical angular spreaders, an axicon array, prismatic array, diffraction grating, or micro lens array.

An example as described alone or in combination with any of the above or below examples, wherein the image capture system includes a structured light illuminator, an output of which is usable by the depth sensing module as captured by the one or more images to determine the distance to the one or more objects in the object scene.

An example as described alone or in combination with any of the above or below examples, wherein the transmitted light is not visible to a human eye.

In one or more examples, a technique is described to perform remote depth sensing of objects in an image scene using diffusion by a computing device. The technique includes receiving one or more images by the computing device of an image scene from an image capture system having diffusion applied internally by the image capture system, determining a distance to one or more objects in the image scene by the computing device based on an amount of blurring exhibited by the one or more objects in the received images, and outputting the determined distance by the computing device.

An example as described alone or in combination with any of the above or below examples, further comprising controlling the application of the diffusion by the computing device.

An example as described alone or in combination with any of the above or below examples, wherein the controlling is performed mechanically to switch polarization states to diffuse light transmitted internally within the image capture system.

An example as described alone or in combination with any of the above or below examples, wherein the controlling is performed mechanically to switch polarization states to diffuse light transmitted internally within the image capture system.

In one or more examples, an image capture system includes an imaging lens configured to transmit light from an object scene, an image sensor configured to capture the transmitted light from the object scene to form one or more images, and an optical diffuser disposed within an intermediate image plane between the imaging lens and the image sensor, the optical diffuser increasing a depth of field available to the image sensor from the imaging lens.

An example as described alone or in combination with any of the above or below examples, further comprising a depth sensing module configured to receive one or more images from the image sensor and determine a distance to one or more objects in an object scene captured by the one or more images a depth by diffusion technique that is based at least in part on an amount of blurring exhibited by respective said objects in the one or more images.

An example as described alone or in combination with any of the above or below examples, wherein the application of the diffusion by the optical diffuser is switchable between diffused and non-diffused states.

An example as described alone or in combination with any of the above or below examples, wherein the switching is performed mechanically to switch polarization states to diffuse light transmitted internally within the image capture system.

An example as described alone or in combination with any of the above or below examples, wherein the switching is performed electrically to switch polarization states to diffuse light transmitted internally within the image capture system.

An example as described alone or in combination with any of the above or below examples, wherein the optical diffuser is configured to have a random surface relief, alternating optical angular spreaders, an axicon array, prismatic array, diffraction grating, or micro lens array.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A remote depth sensing system configured to sense depth as relayed from diffusion, the system comprising:
    an image capture system including an image sensor, an imaging lens configured to transmit light to the image sensor through an intermediate image plane that is disposed behind the imaging lens within the image capture system, and an optical diffuser disposed proximal to the intermediate image plane and configured to switch between a diffusing state and a non-diffusing state, where in the diffusing state the optical diffuser is configured to diffuse the light transmitted to the image sensor and in the non-diffusing state the optical diffuser is configured to not diffuse the light transmitted to the image sensor, wherein the image capture system is configured to 1) alternately switch the optical diffuser between the diffusing state and the non-diffusing state for a plurality of images, 2) while the optical diffuser is in the diffusing state, capture a first set of images of a scene via the image sensor, and 3) while the optical diffuser is in the non-diffusing state, capture a second set of images of the scene via the image sensor, wherein the plurality of images include alternating diffuse and non-diffuse images of the first and second sets; and
    a depth sensing module configured to (1) receive the first set of images, (2) receive the second set of images of the scene from the image sensor, and (3) determine a distance to one or more objects in the scene captured by the first and second sets of images using a depth by diffusion technique that is based at least in part on an amount of blurring exhibited by respective said objects in the first and second sets of images.

2. A system as described in claim 1, wherein the optical diffuser is configured to mechanically switch polarization states to diffuse the transmitted light.

3. A system as described in claim 1, wherein the optical diffuser is configured to electrically switch polarization states to diffuse the transmitted light.

4. A system as described in claim 1, wherein the image capture system includes a linear polarizer and the optical diffuser is a polarization-sensitive diffuser.

5. A system as described in claim 4, wherein the polarization-sensitive diffuser includes a laminate structure having an embedded surface relief laminated with an adjacent liquid crystal layer that is aligned to provide diffusion in a polarization state and does not provide the diffusion for an orthogonal polarization state.

6. A system as described in claim 5, wherein an optical path difference (OPD) is minimized by the laminate structure between the polarization state and the orthogonal polarization state.

7. A system as described in claim 1, wherein the image sensor is configured to capture a plurality of polarization states simultaneously from the optical diffuser.

8. A system as described in claim 1, wherein the optical diffuser is configured to have a random surface relief, alternating optical angular spreaders, an axicon array, prismatic array, diffraction grating, or micro lens array, such that the optical diffuser provides an exit numerical aperture in at least one angular dimension.

9. A system as described in claim 1, wherein the image capture system includes a structured light illuminator, an output of which is usable by the depth sensing module as captured by the one or more images to determine the distance to the one or more objects in the scene.

10. A system as described in claim 1, wherein the transmitted light is not visible to a human eye.

11. A system as described in claim 1, wherein the image capture system further includes a telecentric correction lens positioned intermediate the imaging lens and the image sensor, wherein the telecentric correction lens is configured to perform lens acceptance matching of the imaging lens to form the intermediate image plane, and wherein the optical diffuser is positioned proximate to the telecentric correction lens.

12. A method of remote depth sensing of objects in a scene using diffusion by an image capture device, the method comprising:
alternately switching an optical diffuser positioned between an imaging lens and an image sensor of the image capture device between a diffusing state and a non-diffusing state for a plurality of images, where in the diffusing state the optical diffuser is configured to diffuse light transmitted from the imaging lens to the image sensor;
while the optical diffuser is in the diffusing state, capturing a first set of images of a scene via the image sensor;
while the optical diffuser is in the non-diffusing state, capturing a second set images of the scene via the image sensor, wherein the plurality of images include alternating diffuse and non-diffuse images of the first and second sets;
determining a distance to one or more objects in the scene based on an amount of blurring exhibited by the one or more objects in the first and second sets of images; and
outputting the determined distance.

13. A method as described in claim 12, wherein the optical diffuser is mechanically switched between the diffusing state and the non-diffusing state.

14. A method as described in claim 12, wherein the optical diffuser is electrically switched between the diffusing state and the non-diffusing state.

15. An image capture system comprising:
an imaging lens configured to transmit light from a scene;
an image sensor; and
an optical diffuser disposed within an intermediate image plane positioned between the imaging lens and the image sensor, wherein the optical diffuser configured to switch between a diffusing state and a non-diffusing state, where in the diffusing state the optical diffuser is configured to diffuse the light transmitted to the image sensor to increase a depth of field available to the image sensor from the imaging lens, and where in the non-diffusing state the optical diffuser is configured to not diffuse the light transmitted to the image sensor,
wherein the image capture system is configured to 1) alternately switch the optical diffuser between the diffusing state and the non-diffusing state for a plurality of images, 2) while the optical diffuser is in the diffusing state, capture a first set of images of the scene via the image sensor, and 3) while the optical diffuser is in the non-diffusing state, capture a second set of images of the scene via the image sensor, wherein the plurality of images include alternating diffuse and non-diffuse images of the first and second sets.

16. An image capture system as described in claim 15, further comprising a depth sensing module configured to receive the first and second sets of images from the image sensor and determine a distance to one or more objects in the scene captured by the first and second sets of images using a depth by diffusion technique that is based at least in part on an amount of blurring exhibited by respective said objects in the first and second sets of images.

17. An image capture system as described in claim 15, wherein the optical diffuser is configured to mechanically switch between the diffusing state and the non-diffusing state.

18. An image capture system as described in claim 15, wherein the optical diffuser is configured to electrically switch between the diffusing state and the non-diffusing state.

19. An image capture system as described in claim 15, wherein the optical diffuser is configured to have a random surface relief, alternating optical angular spreaders, an axicon array, prismatic array, diffraction grating, or micro lens array such that the optical diffuser provides an exit numerical aperture in at least one angular dimension.

20. An image capture system as described in claim 15, wherein the image capture system further includes a telecentric correction lens positioned intermediate the imaging lens and the image sensor, wherein the telecentric correction lens is configured to perform lens acceptance matching of the imaging lens to form the intermediate image plane, and wherein the optical diffuser is positioned proximate to the telecentric correction lens.

* * * * *